United States Patent
Goto et al.

(10) Patent No.: US 9,175,587 B2
(45) Date of Patent: Nov. 3, 2015

(54) SUBSTRATE WITH SURFACE-COLLECTION-LAYER AND CATALYST-CARRYING SUBSTRATE WITH SURFACE-COLLECTION-LAYER

(75) Inventors: Chika Goto, Nagoya (JP); Masataka Yamashita, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 611 days.

(21) Appl. No.: 12/974,259

(22) Filed: Dec. 21, 2010

(65) Prior Publication Data
US 2011/0212831 A1   Sep. 1, 2011

(30) Foreign Application Priority Data

Dec. 25, 2009 (JP) ................. 2009-295781
Dec. 17, 2010 (JP) ................. 2010-282140

(51) Int. Cl.
*B01J 32/00* (2006.01)
*B01J 35/04* (2006.01)
*B01J 35/10* (2006.01)
*F01N 3/022* (2006.01)
*B01D 46/24* (2006.01)

(52) U.S. Cl.
CPC .......... *F01N 3/0222* (2013.01); *B01D 46/2474* (2013.01); *B01D 2279/30* (2013.01); *F01N 2510/0682* (2013.01); *Y02T 10/20* (2013.01); *Y02T 10/22* (2013.01)

(58) Field of Classification Search
None
See application file for complete search history.

(56) References Cited

U.S. PATENT DOCUMENTS

| | | | |
|---|---|---|---|
| 4,390,355 A | 6/1983 | Hammond, Jr. et al. | |
| 5,114,581 A * | 5/1992 | Goldsmith et al. | ........... 210/650 |
| 5,221,484 A | 6/1993 | Goldsmith et al. | |
| 2004/0037998 A1* | 2/2004 | Noda et al. | ..................... 428/116 |
| 2006/0185335 A1 | 8/2006 | Ichikawa | |
| 2007/0049492 A1 | 3/2007 | Miyairi et al. | |
| 2008/0044319 A1 | 2/2008 | Takahashi et al. | |
| 2008/0125316 A1 | 5/2008 | Noda et al. | |
| 2008/0264010 A1* | 10/2008 | Mizuno et al. | ............... 55/350.1 |

(Continued)

FOREIGN PATENT DOCUMENTS

| | | |
|---|---|---|
| DE | 10 2005 047 598 A1 | 4/2007 |
| JP | 2006-000685 | 1/2006 |

(Continued)

OTHER PUBLICATIONS

Kai et al, JP 2006-000685, May 2006, English Translation from PAJ website.*

(Continued)

*Primary Examiner* — Melvin C Mayes
*Assistant Examiner* — Colin W Slifka
(74) *Attorney, Agent, or Firm* — Burr & Brown, PLLC (57) ABSTRACT

A substrate with a surface-collection-layer includes a honeycomb substrate having a porous partition wall that defines and forms cells, and a plurality of plugging portions. A surface-collection-layer is formed on a surface of the partition wall that forms the remaining cells, and the thickness of the surface-collection-layer on the outlet-side open end is larger than the thickness of the surface-collection-layer in a center area of the substrate. The partition wall has predetermined thickness, porosity, and average pore size. The surface-collection-layer has a predetermined thickness, porosity, and average pore size, and the substrate has a predetermined cell density.

6 Claims, 4 Drawing Sheets

(56) References Cited

U.S. PATENT DOCUMENTS

2008/0314008 A1 12/2008 Komori et al.
2010/0135866 A1 6/2010 Mizuno et al.

FOREIGN PATENT DOCUMENTS

JP   2006-231162 A   9/2006
WO   2007/026806 A1  3/2007

OTHER PUBLICATIONS

U.S. Appl. No. 13/469,252, filed May 11, 2012, Miyairi, Yukio.
Japanese Office Action, Japanese Application No. 2010-282140, dated Apr. 8, 2014 (2 pages).
European Office Action (Application No. 10252195.2) dated Dec. 19, 2014.

* cited by examiner

SUBSTRATE WITH SURFACE-COLLECTION-LAYER AND CATALYST-CARRYING SUBSTRATE WITH SURFACE-COLLECTION-LAYER

BACKGROUND OF THE INVENTION

1. Field of the Invention

The present invention relates to a substrate with a surface-collection-layer and a catalyst-carrying substrate with a surface-collection-layer. More particularly, the present invention relates to a substrate with a surface-collection-layer and a catalyst-carrying substrate with a surface-collection-layer that have a sufficient partition wall strength, a low pressure loss, and a high particulate matter collection efficiency, and may be used for a gasoline direct injection engine.

2. Description of Related Art

Exhaust gas discharged from an internal combustion engine (e.g., diesel engine) or a combustion apparatus (hereinafter may be appropriately referred to as "internal combustion engine or the like") contains a large amount of particulate matter (hereinafter may be appropriately referred to as "particulate matter", "particulate" or "PM") that mainly contains soot (black smoke). If particulate matter is directly discharged to the atmosphere, environmental pollution occurs. Therefore, a filter that collects particulate is generally provided in an exhaust gas passage from an internal combustion engine or the like.

Figure 7:
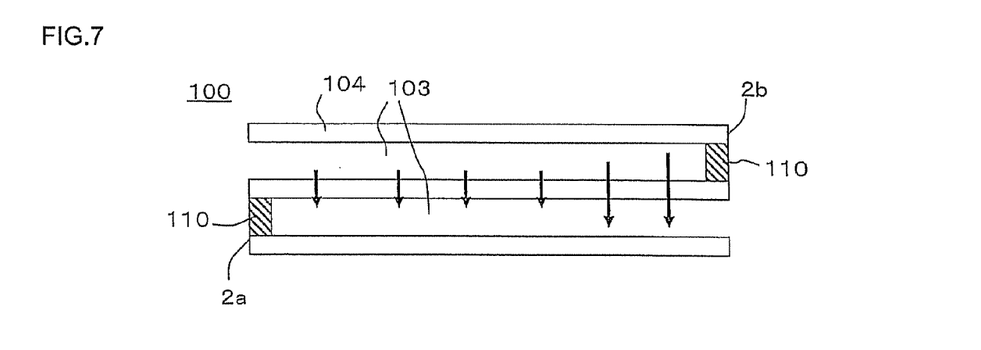
FIG. 7 is a cross-sectional view showing a related-art wall-flow type filter corresponding to FIG. 3.

For example, a honeycomb filter 100 (wall-flow type filter) shown in FIG. 7 has been known as a honeycomb filter used for such a purpose (see Patent Document 1, for example). The honeycomb filter 100 includes a honeycomb structure having a plurality of cells 103 (exhaust gas passages) defined by a partition wall 104 formed of a porous ceramic having a number of pores, one open end and the other open end of the cells 103 being alternately plugged by plugging portions 110. According to such a honeycomb filter, when exhaust gas is introduced into the exhaust gas inlet cells, particulate matter contained in the exhaust gas is collected by the partition wall when the exhaust gas passes through the partition wall. The exhaust gas from which particulate matter has been removed (i.e., purified gas) is discharged from the purified gas outlet cells.

RELATED-ART DOCUMENT

[Patent Document 1] JP-A-2006-685

In recent years, a reduction in fuel consumption of automobiles has been desired from the viewpoint of environmental protection and resource saving. A gasoline direct injection engine has been increasingly used for passenger cars in order to improve (reduce) fuel consumption. On the other hand, a gasoline direct injection engine has a problem in that particulate matter (e.g., soot) is produced due to combustion of gasoline, differing from an intake port fuel injection engine. Therefore, measures to prevent particulate matter from being discharged to the atmosphere have been desired in view of considering atmospheric environment.

Figure 3:
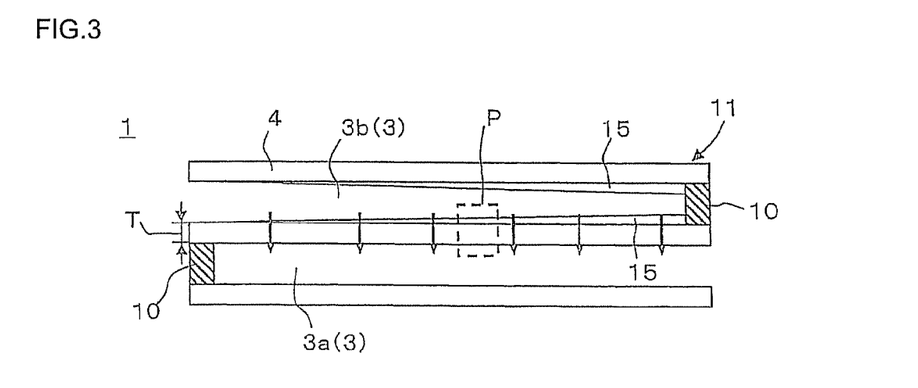
FIG. 3 is a partially enlarged cross-sectional view schematically showing the substrate with a surface-collection-layer shown in FIG. 2.

For example, a filter disclosed in Patent Document 1 that is used for a diesel engine may be installed for a gasoline direct injection engine. In this case, however, the following problems may occur.
(1) When installing the above filter in addition to a three-way catalyst converter or a NOx adsorption/reduction catalyst used for a conventional gasoline engine exhaust treatment, the pressure loss of the exhaust system increases, so that the engine output decreases to an unacceptable level. (2) It is deemed that in order to prevent a decrease in engine output, a three-way catalyst converter may be implemented by coating the pores in the partition wall of a wall-flow type filter with a three-way catalyst, and used instead of a three-way catalyst converter or a NOx adsorption/reduction catalyst thereby preventing increase of a number of converters. However, there is a problem that the pressure loss of the wall-flow type filter increases when coating the wall-flow type filter with the three-way catalyst. (3) It is deemed that an increase in pressure loss may be prevented by increasing the pore size and the porosity of the partition wall of the wall-flow type filter. Specifically, when coating the wall-flow type filter with a three-way catalyst or a NOx adsorption/reduction catalyst, an increase in pressure loss may be prevented by increasing the pore size and the porosity of the partition wall of the wall-flow type filter. In this case, however, the particulate matter (e.g., soot) collection efficiency decreases. (4) When coating the wall-flow type filter with a three-way catalyst to implement a gas purification function, since the flow of gas that passes through the partition wall is concentrated in an area around the outlet (outlet-side open end face 2$b$), as shown in FIG. 7, there is a problem that the catalyst supported in an area around the outlet deteriorates to a large extent. In other words, there is a problem that the catalyst supported in an area around the inlet (inlet-side open end face 2$a$) and the center area is not effectively utilized. FIG. 7 is a cross-sectional view corresponding to FIG. 3 showing a related-art wall-flow type filter 100. In FIG. 7, an arrow indicates the flow of gas, and the length of the arrow indicates the amount of gas (the longer the arrow, the larger the amount of gas).

Therefore, development of a filter (substrate with a surface-collection-layer) for a gasoline direct injection engine has been desired. Specifically, development of a substrate with a surface-collection-layer that has a sufficient partition wall strength, a low pressure loss, and a high particulate matter collection efficiency, and may be used for a gasoline direct injection engine, has been desired.

SUMMARY OF THE INVENTION

The present invention was conceived in view of the above problems. An object of the present invention is to provide a substrate with a surface-collection-layer and a catalyst-carrying substrate with a surface-collection-layer that have a sufficient partition wall strength, a low pressure loss, and a high particulate matter collection efficiency, and may be used for a gasoline direct injection engine.

The present invention provides the following substrate with a surface-collection-layer and the following catalyst-carrying substrate with a surface-collection-layer.

According to a first aspect of the present invention, a substrate with a surface-collection-layer that is used for a gasoline direct injection engine is provided. The substrate comprises a honeycomb substrate that includes a porous partition wall that defines an forms a plurality of cells serving as exhaust gas passages, and has a number of pores, and a plurality of plugging portions that plug an inlet-side open end of given cells among the plurality of cells, and plug an outlet-side open end of the remaining cells. A surface-collection-layer has an average pore size smaller than that of the partition wall being formed on a surface of the partition wall that defines the remaining cells, and the thickness of the surface-collection-layer on the outlet-side open end is larger than the thickness of the surface-collection-layer in a center area of the substrate in a cross section parallel to a center axis of the substrate. The partition wall has a thickness of 50.8 to 304.8 μm, a porosity of 50% or more and less than 70%, and an average pore size of 15 to 40 µm, and the surface-collection-layer has a thickness of 10 µm or more and less than 100 µm, a porosity of 50% or more and less than 90%, and an average pore size of 0.1 µm or more and less than 10 µm. The substrate has a cell density of 15.5 to 62.0 cells/cm$^2$.

According to a second aspect of the present invention, the substrate with a surface-collection-layer according to the first aspect is provided, wherein the surface-collection-layer is formed by supplying a raw material gas including raw material particles through the inlet-side open end of the honeycomb substrate so that the raw material particles are deposited on the surface of the partition wall that forms the remaining cells.

According to a third aspect of the present invention, the substrate with a surface-collection-layer according to the first aspect is provided, wherein the substrate being formed of a material that contains at least one ceramic selected from the group consisting of cordierite, aluminum titanate, silicon carbide, sialon, mullite, silicon nitride, zirconium phosphate, zirconia, titania, alumina, and silica.

According to a fourth aspect of the present invention, a catalyst-carrying substrate with a surface-collection-layer is provided, comprising the substrate according to the first aspect, and a catalyst that is supported on at least an inner surface of the pores in the partition wall of the substrate.

According to a fifth aspect of the present invention, the catalyst-carrying substrate with a surface-collection-layer according to the fourth aspect is provided, wherein the catalyst is a three-way catalyst or a NOx adsorption/reduction catalyst.

The substrate with a surface-collection-layer of the present invention has advantages that a sufficient partition wall strength, a low pressure loss, and a high particulate matter collection efficiency, and may be used for a gasoline direct injection engine.

The catalyst-carrying substrate with a surface-collection-layer of the present invention has advantages that a sufficient partition wall strength, a low pressure loss, and a high particulate matter collection efficiency, and may be used for a gasoline direct injection engine.

DETAILED DESCRIPTION OF THE INVENTION

Embodiments of the present invention are described below. Note that the present invention is not limited to the following embodiments. Various modifications, improvements, and the like may be appropriately made of the following embodiments without departing from the scope of the present invention based on the knowledge of a person skilled in the art.

[1] Substrate with Surface-Collection-Layer

Figure 1:
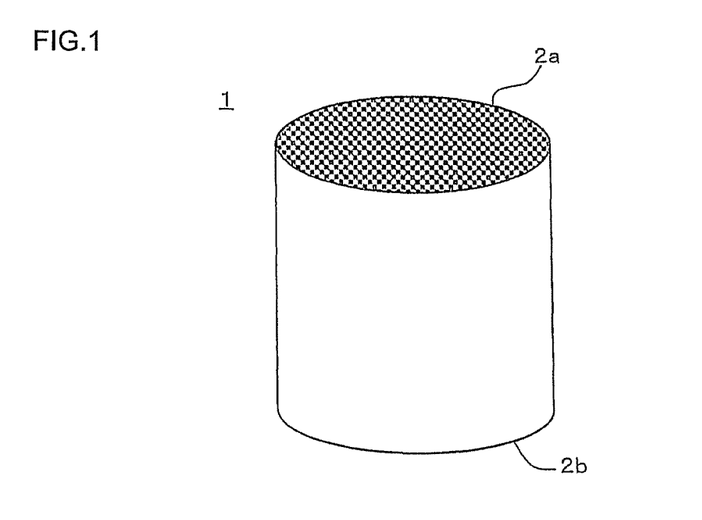
FIG. 1 is a perspective view schematically showing a substrate with a surface-collection-layer according to one embodiment of the present invention.
Figure 2:
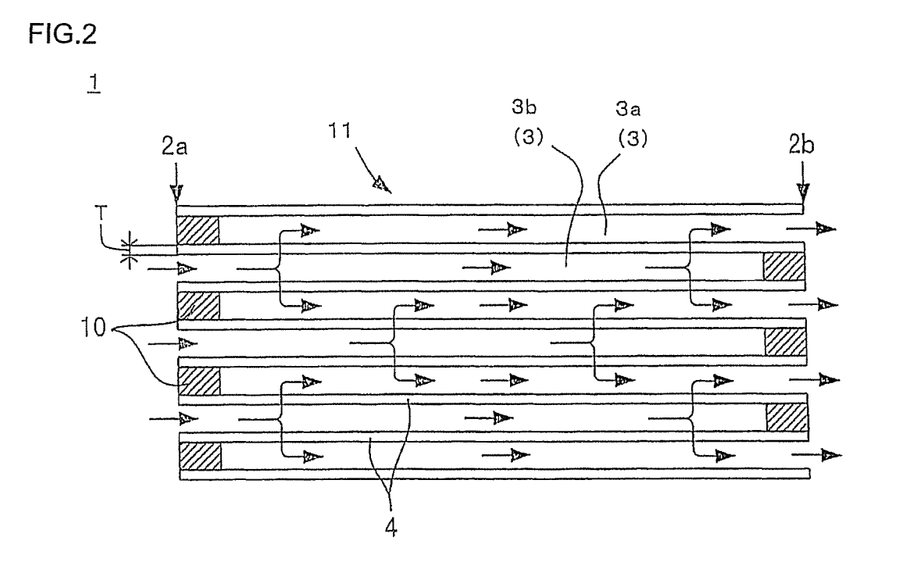
FIG. 2 is a cross-sectional view of the substrate with a surface-collection-layer shown in FIG. 1 along the cell extension direction.

A substrate 1 with a surface-collection-layer according to one embodiment of the present invention shown in FIGS. 1 to 3 is used for a gasoline direct injection engine, and includes a honeycomb substrate 11 that includes a porous partition wall 4 that defines and forms a plurality of cells 3 serving as exhaust gas passages, and has a number of pores, and a plurality of plugging portions 10 that plug an inlet-side open end of given cells 3a among the plurality of cells 3, and plug an outlet-side open end of the remaining cells 3b, wherein a surface-collection-layer 15 that is formed of a porous material having a number of pores, and has an average pore size smaller than that of the partition wall 3, being formed on a surface of the partition wall 3 that defines the remaining cells 3b, and the thickness of the surface-collection-layer 15 on the outlet-side open end being larger than the thickness of the surface-collection-layer 15 in a center area of the substrate 1 in a cross section parallel to a center axis of the substrate 1. The partition wall 3 has a thickness of 50.8 to 304.8 µm (50.8 µm or more and 304.8 µm or less), a porosity of 50% or more and less than 70%, and an average pore size of 15 to 40 µm. The surface-collection-layer 15 has a thickness of 10 µm or more and less than 100 µm, a porosity of 50% or more and less than 90%, and an average pore size of 0.1 µm or more and less than 10 µm. The cell density is 15.5 to 62.0 cells/cm$^2$ (15.5 cells/cm$^2$ or more and 62.0 cells/cm$^2$ or less).

Since a substrate with a surface-collection-layer that satisfies all of the above requirements, it has a sufficient partition wall strength, a low pressure loss, and a high particulate matter collection efficiency, and may be used as a filter for a gasoline direct injection engine. Note that the term "gasoline direct injection engine" used herein refers to a spark-ignition internal combustion engine that uses gasoline as a fuel, has a sparking plug, and directly injects a fuel into a cylinder of the engine using a fuel injection valve. It suffices that the thickness of the surface-collection-layer 15 on the outlet-side open end is larger than the thickness of the surface-collection-layer 15 in the center area of the substrate 1. Therefore, as shown in FIG. 3, the exhaust gas passage (cell 3) may gradually become narrow from the inlet-side open end to the outlet-side open end (i.e., the open area at the outlet-side open end may be smaller than the open area at the inlet-side open end), or the open area of the exhaust gas passage (cell) at the inlet-side open end may be the same as that at the outlet-side open end.

FIG. 1 is a perspective view schematically showing the substrate with a surface-collection-layer according to one embodiment of the present invention, and FIG. 2 is a cross-sectional view showing the substrate with a surface-collection-layer shown in FIG. 1 along the cell extension direction. FIG. 3 is a partially enlarged cross-sectional view showing the substrate shown in FIG. 2.

The substrate with a surface-collection-layer according to one embodiment of the present invention must have a cell density of 15.5 to 62.0 cells/cm$^2$, and preferably 15.5 to 38.0 cells/cm$^2$. If the cell density is less than 15.5 cells/cm$^2$, a decrease in partition wall strength, an increase in filtration flow rate, and a decrease in PM collection efficiency may occur. If the cell density exceeds 62.0 cells/cm$^2$, a pressure loss may increase. The cell density used herein refers to a value calculated by observing one end face of the substrate with a surface-collection-layer using a scanning electron microscope (SEM), and measuring the number of cells present in an arbitrarily selected area included in the observation field.

In the substrate with a surface-collection-layer according to the present invention, the ratio of the total open area of the cells to the sum of the cross-sectional area of the partition wall and the total open area of the cells in the cross section perpendicular the cell extension direction (hereinafter may be referred to as "cell cross-sectional opening ratio") is preferably 83 to 90%, and more preferably 86 to 88%. If the cell cross-sectional opening ratio is less than 83%, a pressure loss may increase. If the cell cross-sectional opening ratio exceeds 90%, a decrease in partition wall strength, an increase in filtration flow rate, and a decrease in PM collection efficiency may occur.

It is preferable that the cross-sectional shape of the substrate with a surface-collection-layer along the direction perpendicular to the cell extension direction conform to the inner shape of an exhaust system in which the substrate is installed. Specific examples include a circle, an ellipse, an oval, a trapezoid, a triangle, a quadrangle, a hexagon, an asymmetric shape, and the like. Among these, a circle, an ellipse, or an oval is preferable.

Further, examples of the cross-sectional shape of the cell along the direction perpendicular to the cell extension direction include a circle, an ellipse, an oval, a trapezoid, a triangle, a quadrangle, a hexagon, an octagon, an asymmetric shape, and the like. Among these, a circle, a hexagon, or an octagon is preferable. It is preferable that the cells that are plugged on the inlet side (i.e., the cells that are open on the outlet side) be smaller in size (open area) than the cells that are plugged on the outlet side (i.e., the cells that are open on the inlet side). When the open area of the cells that are open on the inlet side is larger than that of the cells that are open on the outlet side, a sufficient space remains in the cells even if PM or ash contained in combustion gas is deposited in the cells that are open on the inlet side during use. This makes it possible to suppress an increase in pressure loss due to deposition of ash.

[1-1] Honeycomb Substrate

The honeycomb substrate includes the porous partition wall that defines and forms a plurality of cells serving as exhaust gas passages, and has a number of pores, and a plurality of plugging portions that plug the inlet-side open end of given cells among the plurality of cells, and plug the outlet-side open end of the remaining cells. The honeycomb substrate is preferably formed of a material that contains at least one ceramic selected from the group consisting of cordierite, aluminum titanate, silicon carbide, sialon, mullite, silicon nitride, zirconium phosphate, zirconia, titania, alumina, and silica. A honeycomb substrate formed of such a material exhibits high heat resistance, and maintains its function even when exposed to high-temperature exhaust gas. The material for the partition wall and the material for the plugging portions may be either the same or different.

[1-1a] Partition Wall

The partition wall defines and forms a plurality of cells serving as exhaust gas passages, and is formed of a porous material having a number of pores. Such a partition wall allows exhaust gas that has entered the substrate with a surface-collection-layer from one end face to enter the adjacent cells, so that particulate matter contained in the exhaust gas can be collected. The exhaust gas can thus be purified.

The thickness (rib thickness) of the partition wall must be 50.8 to 304.8 μm, and preferably 76.2 to 127 μm. If the thickness of the partition wall is less than 50.8 μm, a decrease in partition wall strength and a decrease in collection efficiency of particulate matter contained in exhaust gas may occur. If the thickness of the partition wall exceeds 304.8 μm, a pressure loss may increase. The thickness of the partition wall used herein refers to a value obtained by observing one end face of the substrate with a surface-collection-layer using a scanning electron microscope (SEM), measuring the thickness of an arbitrarily selected ten areas of the partition wall included in the observation field, and calculating the average thickness. In FIGS. 2 and 3, the thickness of the partition wall 4 is indicated by "T".

The porosity of the partition wall must be 50% or more and less than 70%, and preferably 62% or more and less than 70%. If the porosity of the partition wall is less than 50%, a pressure loss may increase. If the porosity of the partition wall is 70% or more, the strength of the partition wall may decrease. The term "porosity" used herein refers to a value measured using a mercury porosimeter.

The average pore size of the partition wall must be 15 to 40 μm, and preferably 25 to 40 μm. If the average pore size of the partition wall is less than 15 μm, a pressure loss may increase. If the average pore size of the partition wall exceeds 40 μm, the PM collection efficiency may decrease. The term "average pore size" used herein refers to a value measured using a mercury porosimeter.

The substrate with a surface-collection-layer according to the present invention preferably has a coefficient of thermal expansion measured at 40 to 800° C. in the cell extension direction of $1.0\times10^{-6}/°$ C. or less. When using the substrate with a surface-collection-layer as a catalyst body in which a catalyst is supported on the substrate, the coefficient of thermal expansion of the substrate is more preferably $0.8\times10^{-6}/°$ C. or less, and particularly preferably $0.5\times10^{-6}/°$ C. or less. If the coefficient of thermal expansion exceeds $1.0\times10^{-6}/°$ C., a thermal stress may occur during use at a high temperature, so that breakage may occur. The term "coefficient of thermal expansion" used herein refers to a value measured by pushrod dilatometry.

[1-1b] Plugging Portion

The plugging portions plug the inlet-side open end of given cells among the plurality of cells, and plug the outlet-side open end of the remaining cells. A substrate with a surface-collection-layer that shows a low pressure loss, and exhibits a high collection efficiency of particulate matter (PM) contained in exhaust gas, can be obtained by utilizing such plugging portions.

The arrangement of the plugging portions is not particularly limited insofar as the plugging portions are disposed to plug the cells on either end face. For example, it is preferable that the plugging portions are disposed in a checkered pattern as shown as the substrate with a surface-collection-layer 1 of FIG. 1.

[1-2] Surface-Collection Layer

The substrate with a surface-collection-layer can collect particulate matter contained in exhaust gas, and prevents particulate matter from entering the pores in the partition wall due to the surface-collection-layer. When particulate matter has entered the pores in the partition wall, the particulate matter may be deposited in the pores, so that a pressure loss may occur. The surface-collection-layer ensures that particulate matter is burned at an appropriate rate while suppressing an increase in pressure loss.

The surface-collection-layer is formed on the surface of the partition wall that forms the remaining cells, and has an average pore size smaller than that of the partition wall. The thickness of the surface-collection-layer on the outlet-side open end is larger than the thickness of the surface-collection-layer in the center area of the substrate with a surface-collection-layer in a cross section parallel to the center axis of the substrate. Note that the center area of the substrate with a surface-collection-layer refers to an area positioned between the exhaust gas inlet-side end face (inlet-side open end face 2a) and the exhaust gas outlet-side end face (outlet-side open end face 2b), as shown in FIG. 2.

The surface-collection-layer is preferably formed so that the thickness of the surface-collection-layer increases from the inlet-side open end face toward the outlet-side open end face. FIG. 3 shows an example in which the surface-collection-layer 15 is formed so that the thickness of the surface-collection-layer 15 increases from the inlet-side open end face 2a toward the outlet-side open end face 2b. Since exhaust gas that has entered the substrate evenly passes through the partition wall by thus forming the surface-collection-layer, there is an advantage that the service life of the substrate increases. In other words, if the surface-collection-layer has a uniform thickness, the flow of exhaust gas that passes through the partition wall is concentrated in an area around the outlet (outlet-side open end face 2b), so that a catalyst supported in an area around the outlet may deteriorate to a large extent, or an area around the outlet may be clogged. On the other hand, since the flow of exhaust gas becomes uniform by forming the surface-collection-layer as described above, the substrate with a surface-collection-layer is effectively utilized.

The thickness of the surface-collection-layer is 10 μm or more and less than 100 μm, and preferably 10 to 50 μm. If the above thickness is less than 10 μm, soot may not be sufficiently collected by the surface-collection-layer, so that the collection efficiency may decrease. Moreover, soot may be deposited in the pores in the partition wall, so that a pressure loss may increase. If the thickness of the surface-collection-layer exceeds 100 μm, the passage resistance of exhaust gas may increase, so that the pressure loss of the substrate may increase. As a result, the engine output may decrease.

Figure 4:
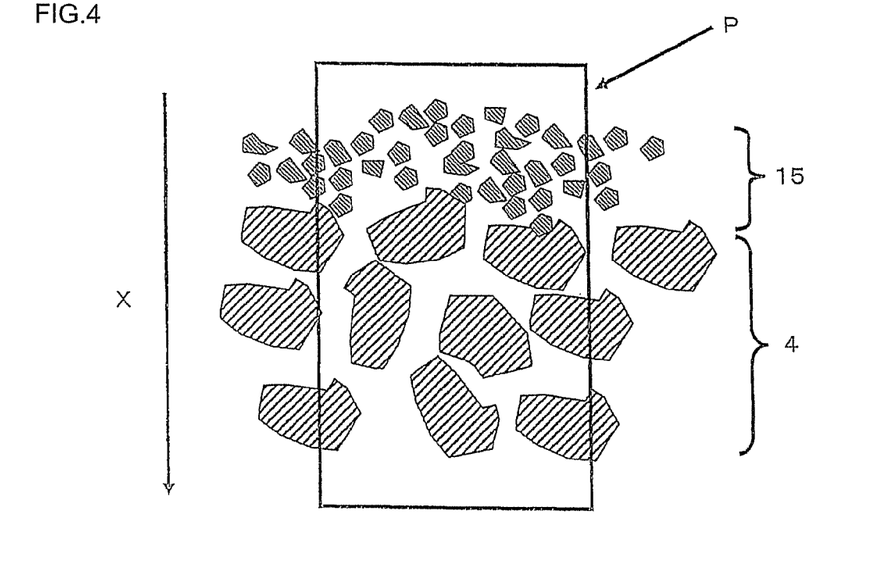
FIG. 4 is a partially enlarged cross-sectional view schematically showing the substrate with a surface-collection-layer shown in FIG. 3.
Figure 5:
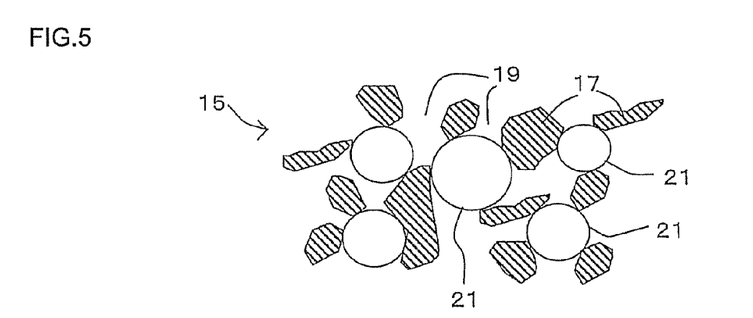
FIG. 5 is a partially enlarged cross-sectional view, schematically showing a surface-collection-layer of the substrate with a surface-collection-layer shown in FIG. 4.
Figure 6:
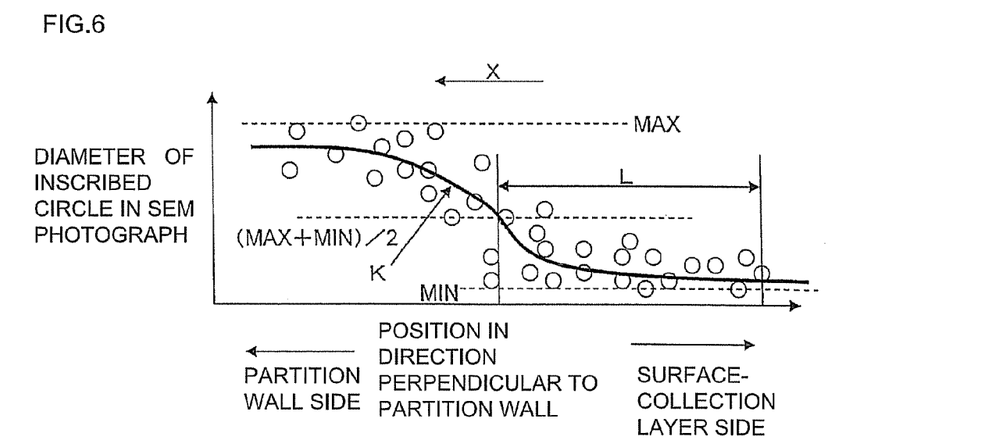
FIG. 6 is a graph showing the relationship between the position in the direction perpendicular to the partition wall and the diameters of inscribed circles in a scanning electron microscope (SEM) photograph.

Here, the thickness of the surface-collection-layer is calculated as follows. First, a field (e.g., area indicated by "P" in FIG. 4) of the cross section of the partition wall (polished surface) including the surface-collection-layer and the partition wall is photographed using an SEM, and the SEM photograph is binarized based on the difference in luminance between the solid area and the void area. Next, as shown in FIG. 5, circles (inscribed circles 21) that are inscribed in the boundaries between solid areas 17 and a void area 19 are drawn. The diameters and the positions of the inscribed circles 21 are plotted in the direction from the surface-collection-layer to the partition wall (i.e., in a direction X shown in FIG. 4), and a cubic curve K is calculated by least squares approximation (see FIG. 6). The depth (surface-collection-layer depth L) at which the cubic curve K calculated by least squares approximation intersects the average line of the maximum diameter (MAX) and the minimum diameter (MIN) of the inscribed circles 21 included in the binarized image is measured for twenty or more fields, and the average value of the measured values is calculated, and taken as the thickness of the surface-collection-layer. FIG. 5 is a partially enlarged cross-sectional view schematically showing the surface-collection-layer of the substrate shown in FIG. 4, wherein the circles (inscribed circles 21) that are inscribed in the boundaries between the solid areas 17 and the void area 19 are drawn. FIG. 6 is a graph showing the relationship between the position in the direction perpendicular to the partition wall (i.e., the position in the thickness direction of the partition wall) and the diameters of the inscribed circles in the SEM photograph (i.e., the diameters of the inscribed circles in the binarized scanning electron micrograph).

Therefore, when binarizing the SEM photograph based on the difference in luminance, plotting the diameters of the inscribed circles that are inscribed in the boundaries between the solid areas and the void area, and calculating a cubic curve by least squares approximation, the boundary between the surface-collection-layer and the partition wall is located at the depth (position) at which the cubic curve calculated by least squares approximation intersects the average line of the maximum diameter and the minimum diameter of the inscribed circles. The surface-collection-layer refers to an area from the surface that defines the cell to the above boundary.

It is preferable that the thickness of the surface-collection-layer on the outlet-side open end is larger than the thickness of the surface-collection-layer in the center area by a factor of 1.1 to 3, and more preferably 1.1 to 1.5. If the factor is less than 1.1, the flow rate distribution of the flow of exhaust gas (exhaust gas flow) that passes through the partition wall may become non-uniform, so that a pressure loss may increase. If the factor is more than 3, the hydraulic diameter of the cell passage in an area around the outlet may significantly decrease, so that the pressure loss of the cell passage may increase. As a result, the pressure loss of the substrate with a surface-collection-layer may increase to a large extent, so that the engine output may decrease. Note that the "thickness of the surface-collection-layer on the outlet-side open end" refers to the thickness of the surface-collection-layer in an area positioned closest to the outlet-side open end face, and the "thickness of the surface-collection-layer in the center area" refers to the thickness of the surface-collection-layer at an intermediate position in the lengthwise direction of the substrate i.e., the thickness of the surface-collection-layer at an intermediate position between the end faces.

The porosity of the surface-collection-layer must be 50% or more and less than 90%, and preferably 80% or more and less than 90%. If the porosity of the surface-collection-layer is less than 50%, the flow rate of exhaust gas may increase in the voids of the surface-collection-layer, so that a pressure loss after collecting PM may increase. As a result, a defect which is decrease of the engine output may occur. On the other hand, if the porosity of the surface-collection-layer is 90% or more, the strength of the surface-collection-layer may decrease, so that a defect which is removal of the surface-collection-layer may occur due to a high-speed exhaust gas flow or a heat cycle.

The porosity of the surface-collection-layer is calculated as follows. First, an SEM image of the cross section of the partition wall is photographed at a magnification of 1000 or more, and a binarization process is performed on the void area and the solid area. Next, the cross-sectional ratio of the void area to the solid area is calculated for twenty or more fields, and the average cross-sectional ratio is calculated, and taken as the porosity of the surface-collection-layer.

The average pore size of the surface-collection-layer must be 0.1 μm or more and less than 10 μm, and preferably 0.5 to 3.5 μm. If the average pore size is less than 0.1 μm, the pore permeation resistance may rapidly increase due to a decrease in permeability. If the average pore size is 10 μm or more, the collection performance may decrease, so that the PM emission may exceed the Euro 6 regulation value.

The average pore size of the surface-collection-layer is calculated as follows. First, an SEM image of the cross section of the partition wall is photographed at a magnification of 1000 or more, and a binarization process is performed on the void area and the solid area. Next, circles (inscribed circles; indicated by 21 in FIG. 5) inscribed in the contour of the solid area within the void area are drawn at random at twenty or more positions, and the average value of the diameters of the inscribed circles is calculated, and taken as the average pore size of the surface-collection-layer.

The surface-collection-layer may be formed by causing a ceramic slurry to adhere to the surface of the partition wall of the honeycomb substrate by a known ceramic film-forming method (e.g., dipping), and drying and firing the ceramic slurry, for example. The surface-collection-layer is preferably formed by supplying a raw material gas including raw material particles through the inlet-side open end of the honeycomb substrate so that the raw material particles are deposited on the surface of the partition wall that forms the remaining cells. Specifically, a raw material gas (substrate fluid: air or the like) including raw material particles having a particle size distribution of 0.5 to 6 μm and an average particle size (D50) of 2.7 μm is supplied into the remaining cells at 0.005 to 0.4 l/cm$^2$ per minute so that the raw material particles are deposited on the surface of the partition wall that forms the remaining cells to form a deposited layer, followed by drying and firing to form a surface-collection-layer. This makes it possible to easily form the surface-collection-layer. Moreover, a surface-collection-layer having a high porosity can be formed, so that an optimum porosity of the surface-collection-layer can be easily set. Note that the symbol "D50" refers to a median diameter (i.e., a particle diameter at which the cumulative volume is 50%).

The thickness of the surface-collection-layer may be determined by changing the supply flow rate of the raw material gas within the above range. Specifically, the supply flow rate is increased in the initial stage so that the raw material particles reach the inside of the honeycomb substrate, and then reduced. The supply flow rate is then further reduced so that the raw material particles are deposited on the inlet-side open end of the honeycomb substrate. The thickness of the surface-collection-layer on the inlet-side open end can be caused to differ from the thickness of the surface-collection-layer on the outlet-side open end by changing the supply flow rate in this manner.

The substrate with a surface-collection-layer according to the present invention may be a composite formed of a plurality of segments. Specifically, the substrate with a surface-collection-layer may include a plurality of substrate segments with a surface-collection-layer that are stacked, and a bonding section formed of a bonding material that bonds the plurality of substrate segments. As the bonding material, a known bonding material may suitably be used.

[2] Method of Producing Substrate with Surface-Collection-Layer

The substrate with a surface-collection-layer according to the present invention may be produced as follows, for example. First, a cordierite-forming raw material is provided as a kneaded clay material. The cordierite-forming raw material is prepared by mixing a silica source component, a magnesia source component, an alumina source component, and the like in a cordierite crystal theoretical composition. It is preferable to use quartz or fused silica as the silica source component. Further, the particle size of the silica source component is preferably 100 to 150 μm.

Examples of the magnesia source component include talc, magnesite, and the like. Among these, talc is preferable. The content of talc in the cordierite-forming raw material is preferably 37 to 43 mass %. The particle size (average particle size) of talc is preferably 5 to 50 and more preferably 10 to 40 μm. The magnesia (MgO) source component may contain $Fe_2O_3$, $CaO$, $Na_2O$, $K_2O$, and the like as impurities.

The alumina source component preferably contains at least one of aluminum oxide and aluminum hydroxide due to their low impurity content. The content of aluminum hydroxide in the cordierite-forming raw material is preferably 10 to 30 mass %, and the content of aluminum oxide in the cordierite-forming raw material is preferably 0 to 20 mass %.

A kneaded clay material (additive) added to the cordierite-forming raw material is also provided. At least a binder and a pore-forming material are used as additives. A dispersant and a surfactant may be used in addition to the binder and the pore-forming material.

A substance that can be oxidized and removed due to a reaction with oxygen at a temperature equal to or less than the cordierite firing temperature, a low-melting-point reactant that has a melting point equal to or less than the cordierite firing temperature, or the like may be used as the pore-forming material. Examples of the substance that can be oxidized and removed include resins (particularly particulate resins), graphite (particularly particulate graphite), and the like. The low-melting-point reactant may be at least one metal selected from the group consisting of iron, copper, zinc, lead, aluminum, and nickel, an alloy that contains the above metal as the main component (e.g., carbon steel, cast iron, or stainless steel when using iron), or an alloy that contains two or more of the above metals as the main component. Among the above, the low-melting-point reactant is preferably a powdery or fibrous iron alloy. The particle size or the fiber diameter (average diameter) of the iron alloy is preferably 10 to 200 μm. The low-melting-point reactant may have a spherical shape, a caltrop shape, a confetti shape, or the like. The shape of the pores can be easily controlled if the low-melting-point reactant has such a shape.

Examples of the binder include hydroxypropylmethyl cellulose, methyl cellulose, hydroxyethyl cellulose, carboxymethyl cellulose, polyvinyl alcohol, and the like. Examples of the dispersant include dextrin, a polyalcohol, and the like. Examples of the surfactant include a fatty acid soap and the like. These additives may be used either individually or in combination.

With respect to 100 parts by mass of the cordierite-forming raw material, 3 to 8 parts by mass of the binder, 3 to 40 parts by mass of the pore-forming material, 0.1 to 2 parts by mass of the dispersant, and 10 to 40 parts by mass of water are mixed and kneaded to obtain kneaded clay.

So prepared kneaded clay is formed into a honeycomb shape by an extrusion forming method, an injection forming method, a press forming method, or the like to obtain a green honeycomb formed body. It is preferable to use the extrusion forming method since the clay can be continuously formed, and cordierite crystals can be oriented. The extrusion forming method may be implemented using a vacuum kneader, a ram extruder, a twin-screw continuous extruder, or the like.

The honeycomb formed body is then dried to given dimensions to obtain a dried honeycomb body. The honeycomb formed body may be dried by hot-blast drying, microwave drying, dielectric drying, drying under reduced pressure, vacuum drying, freeze drying, or the like. It is preferable to dry the honeycomb formed body by hot-blast drying in combination with microwave drying or dielectric drying since the entire honeycomb formed body can be dried quickly and uniformly.

A raw material for the plugging portions is then provided. The material for the plugging portions (i.e., plugging slurry) may be the same as or different from the kneaded clay material used for the partition wall (dried honeycomb body). Specifically, the material for the plugging portions (i.e., plugging slurry) may be obtained by mixing a ceramic raw material, a surfactant, and water optionally together with a sintering aid, a pore-forming agent, and the like to prepare a slurry, and mixing and kneading the slurry using a mixer or the like.

A part of cell opening portion on one end face of the dried honeycomb body, and the one end face of the dried honeycomb body is immersed in the plugging slurry in a container so that the unmasked cells are filled with the plugging slurry. Likewise, a part of cell opening portion on the other end face of the dried honeycomb body, and the other end face of the dried honeycomb body is immersed in the plugging slurry in a container so that the unmasked cells are filled with the plugging slurry. The dried honeycomb body is then dried and fired to obtain a honeycomb substrate. The drying conditions may be the same as the drying conditions for the honeycomb formed body. In the case where the dried honeycomb body is formed using the cordierite-forming raw material, the firing condition is normally at 1410 to 1440° C. for 3 to 15 hours in air.

Next, a gaseous surface-collection-layer raw material including a powder of a cordierite raw material or the like having a particle size distribution of 0.5 to 6 μm and an average particle size (D50) of 2.7 μm is then supplied from one end side of the honeycomb substrate to the cells at 0.005 to 0.4 l/cm$^2$ per minute so that the surface-collection-layer raw material (powder of a cordierite raw material or the like) in a suspended state is deposited on the surface of the partition wall to form a layer (surface layer) of the surface-collection-layer raw material on the surface of the partition wall. The resulting product is then heat treated at 1280 to 1330° C. for 0.5 to 3 hours so that the surface-collection-layer raw material is melted to be fixed on the partition wall to form a surface-collection-layer.

[3] Catalyst-Carrying Substrate with Surface-Collection-Layer

A catalyst-carrying substrate with a surface-collection-layer according to the present invention includes the substrate with a surface-collection-layer according to the present invention, and a catalyst that is supported on at least the inner surface of the pores in the partition wall of the substrate. Such a catalyst-carrying substrate with a surface-collection-layer has a low pressure loss and a high particulate matter collection efficiency, and may be used for a gasoline direct injection engine preferably. The catalyst-carrying substrate with a surface-collection-layer may be used as a catalyst (e.g., three-way catalyst or NOx adsorption/reduction catalyst) converter, and exhibits a high HC, CO, and NOx purification efficiency, and a low pressure loss.

The catalyst may also be supported on the surface of the surface-collection-layer and the inner surface of the pores in the surface-collection-layer.

Examples of the catalyst include a three-way catalyst, a NOx adsorption/reduction catalyst, an oxidizing catalyst, a NOx selective reduction catalyst containing metal-substituted zeolite as the main component, and the like. Among these, a three-way catalyst or a NOx adsorption/reduction catalyst is preferable.

As the three-way catalyst, a three-way catalyst that contains a noble metal such as platinum, palladium, or rhodium may be used.

Examples of the NOx adsorption/reduction catalyst include alkali metals (e.g., Li, Na, K, and Cs), alkaline earth metals (e.g., Ca, Ba, and Sr), and the like. Examples of the NOx selective reduction catalyst containing metal-substituted zeolite as the main component include iron-substituted zeolite, copper-substituted zeolite, and the like.

The catalyst-carrying substrate with a surface-collection-layer according to the present invention may carry another material such as a noble metal, a promoter, or a noble metal holding material, in addition to the catalyst. Examples of the noble metal include platinum (Pt), rhodium (Rh), palladium (Pd), and the like. These noble metals may be used in combination. Examples of the promoter include alumina, zirconia, ceria, and the like.

The catalyst and another material are preferably used in a total amount of 50 to 200 g/l, and more preferably 50 g/l or more and less than 180 g/l. If the total amount of the catalyst and another material is less than 50 g/l, a noble metal dispersed in the catalyst may easily aggregate, so that the catalytic function and the purification performance may deteriorate. If the total amount of the catalyst and another material exceeds 200 g/l, the pores in the partition wall may be clogged, so that a pressure loss may increase. As to catalyst distribution, amount of catalyst supported on the surface-collection-layer to be as small as possible so that the ratio of the amount of catalyst supported on the partition wall (i.e., the amount of catalyst per unit volume (g/l)) to be as large as possible. It is particularly preferable that the catalyst is supported on only the partition wall (i.e., the catalyst is not supported on the surface-collection-layer). The reason is as follows. When the catalyst is supported on the surface-collection-layer having a small pore size, a pressure loss may increase due to clogging of the pores. Note that a catalyst layer (catalyst coating layer) may be formed on the surface of the partition wall opposite to the side (surface) on which the surface-Collection-layer is formed.

The catalyst may be supported by an arbitrary method. For example, the catalyst may be supported by causing a catalyst slurry to be supported inside the pores in the partition wall by applying a known catalyst supporting method (e.g., suction method), and then drying and firing the catalyst slurry.

EXAMPLES

The present invention is further described below by way of examples. Note that the present invention is not limited to the following examples.

The substrate with a surface-collection-layer was evaluated as follows.

<Thickness (Rib Thickness) (μm) of Partition Wall>

The thickness of the partition wall was determined by observing one end face of the substrate with a surface-collection-layer using a scanning electron microscope (SEM), measuring the thickness of an arbitrarily selected ten areas of the partition wall included in the observation field, and calculating the average thickness.

<Cell Density>

The cell density was calculated by observing one end face of the substrate with a surface-collection-layer using a scanning electron microscope (SEM), and measuring the number of cells present in an arbitrarily selected area.

<Porosity of Partition Wall>

The porosity of the partition wall was measured using a mercury porosimeter ("9810" manufactured by Shimadzu Corporation).

<Average Pore Size of Partition Wall>

The average pore size of the partition wall was measured using a mercury porosimeter ("9810" manufactured by Shimadzu Corporation).

<Porosity of Surface-Collection-Layer>

The porosity of the surface-collection-layer was calculated by SEM image analysis. Specifically, an SEM image of the cross section of the partition wall was photographed at a magnification of 1000 or more, and a binarization process was performed on the void area and the solid area. The cross-sectional ratio of the void area to the solid area was calculated for twenty or more fields, and the average cross-sectional ratio was calculated, and taken as the porosity of the surface-collection-layer.

<Average Pore Size of Surface-Collection-Layer>

The average pore size of the surface-collection-layer was calculated by SEM image analysis. Specifically, an SEM image of the cross section of the partition wall was photographed at a magnification of 1000 or more, and a binarization process was performed based on the difference in luminance between the solid area and the void area of the SEM image. Next, as shown in FIG. 5, circles (inscribed circles 21) that were inscribed in the contour (outer periphery) of three or more solid areas 17 within the void area 19 were randomly drawn at twenty or more positions. The average value of the diameters of the inscribed circles 21 was calculated, and taken as the average pore size of the surface-collection-layer. That is, the term "inscribed circle" used herein refers to a circle that is inscribed in solid areas at three or more points.

<Thickness of Surface-Collection-Layer>

A field (e.g., area indicated by "P" in FIG. 4) of the cross section of the partition wall (polished surface) including the surface-collection-layer and the partition wall was photographed using an SEM, and the SEM photograph was binarized based on the difference in luminance between the solid area and the void area. Next, as shown in FIG. 5, circles (inscribed circles 21) that were inscribed in the boundaries between the solid areas 17 and the void area 19 were drawn. The diameters and the positions of the inscribed circles 21 were plotted in the direction from the surface-Collection-layer to the partition wall (i.e., in the direction X shown in FIG. 4), and the cubic curve K was calculated by least squares approximation (see FIG. 6). The depth (surface-collection-layer depth L) at which the cubic curve K calculated by least squares approximation intersects the average line of the maximum diameter (MAX) and the minimum diameter (MIN) of the inscribed circles 21 included in the binarized image was measured for twenty or more fields, and the average value of the measured values was calculated, and taken as the thickness of the surface-collection-layer.

<PM Collection Efficiency>

Exhaust gas containing soot was passed through the substrate with a surface-collection-layer (or the catalyst-carrying substrate with a surface-collection-layer) using an apparatus that produces soot by incomplete combustion of a light oil fuel (soot production amount: 5 g/h, gas (exhaust gas) flow rate: 1.5 Nm$^3$/min). The soot concentration in the upstream gas (before being supplied to the substrate with a surface-collection-layer) and the soot concentration in the downstream gas (after being discharged from the substrate with a surface-collection-layer) were measured during a first one minute. The ratio of the soot concentration in the downstream gas to the soot concentration in the upstream gas was calculated, and taken as the PM collection efficiency. A case where the PM collection efficiency was 90% or more was evaluated as "Good", and a case where the PM collection efficiency was less than 90% was evaluated as "Bad".

<Pressure Loss>

The substrate with a surface-collection-layer (or the catalyst-carrying substrate with a surface-collection-layer) was installed in a gas burner test apparatus, and a pressure loss was measured at a gas temperature of 850° C. and a flow rate of 7 Nm$^3$/min. A case where the pressure loss was 10 kPa or less was evaluated as "Good", and a case where the pressure loss was more than 10 kPa was evaluated as "Bad" (see "Pressure loss" in Tables 1 and 2).

<Strength>

The substrate with a surface-collection-layer (or the catalyst-carrying substrate with a surface-collection-layer) was subjected to a hydrostatic pressure test. A case where the pressure when breakage occurred was 0.3 MPa or more was evaluated as "Good", and a case where the pressure when breakage occurred was less than 0.3 MPa was evaluated as "Bad".

<Overall Evaluation>

A case where the PM collection efficiency, the pressure loss, and the strength were evaluated as "Good" was evaluated as "Good", and a case where the PM collection efficiency, the pressure loss, or the strength was evaluated as "Bad" was evaluated as "Bad".

The catalyst-carrying substrate with a surface-collection-layer was evaluated as follows. The PM collection efficiency, the pressure loss, the strength, and the overall evaluation were evaluated in the same manner as the substrate with a surface-collection-layer.

<Gas Purification Rate>

The catalyst-carrying substrate with a surface-collection-layer was installed right under an exhaust manifold of a gasoline direct injection engine (2 liter) mounted on a vehicle. An emission test was performed using a chassis dynamometer. A US LA-4 mode operation was used. As a comparison, a catalyst body having an identical external shape (rib thickness: 101.6 μm, cell density: 93.0 cells/cm$^2$, flow-through type (plugging portion was not provided), surface-collection-layer was not provided) and coated with an identical amount of catalyst was provided. A case where the purification rate was equal to or higher than that of the catalyst body was evaluated as "Good", and a case where the purification rate was lower than that of the catalyst body was evaluated as "Bad". Note that HC, CO, and NOx contained in exhaust gas were measured.

Example 1

Preparation of Plugged Honeycomb Structure

Alumina, aluminum hydroxide, kaolin, talc, and silica were used as cordierite-forming raw materials. 13 parts by mass of a pore-forming material, 35 parts by mass of a dispersion medium, 6 parts by mass of an organic binder, and 0.5 parts by mass of a dispersant were added to 100 parts by mass of the cordierite-forming raw materials. The mixture was then kneaded to obtain a kneaded clay.

Water was used as the dispersion medium, coke having an average particle diameter of 10 μm was used as the pore-forming material, hydroxypropylmethyl cellulose was used as the organic binder, and ethylene glycol was used as the dispersant. The kneaded clay was extruded using a given die to obtain a cylindrical honeycomb formed body having a quadrangular cell shape.

The honeycomb formed body was then dried using a microwave dryer, completely dried using a hot-blast dryer, and cut at each end (adjusted to given dimensions) to obtain a dried honeycomb body. Next, the cell opening portions on one end face of the dried honeycomb body were masked in a checkered pattern, and the masked end face was immersed in a plugging slurry containing a cordierite-forming raw material to form plugging portions alternately arranged in a checkered pattern. As to the other end face, the cells that had been plugged on one end face were masked on the other end face, and plugging portions were formed in the same manner as the method for the one end face. The resulting product was dried using a hot-blast dryer, and fired at 1410 to 1440° C. for 5 hours to obtain a plugged honeycomb structure (honeycomb substrate).

<Formation of Surface-Collection-Layer>

A powdery cordierite raw material having an average particle diameter of 2.7 μm was provided as a surface-collection-layer raw material. The surface-collection-layer raw material was suspended in air in a fluidized bed. Air containing the surface-collection-layer raw material in a suspended state was passed (5 l/cm² per minute) through the cells of the honeycomb substrate through one end face so that the surface-collection-layer raw material in a suspended state was collected by (deposited on) the surface of the partition wall to form a layer (surface layer) of the powdery cordierite raw material on the surface of the partition wall. The surface layer was formed in only the cells that were plugged on the exhaust gas outlet-side end face. The weight of the cordierite raw material that formed the surface layer (was deposited) was 7 g per liter (volume) of the plugged honeycomb structure. The honeycomb substrate was then heat treated at 1300° C. for 1 hour so that the surface-collection-layer raw material was melted to be fixed on the partition wall to form a surface-collection-layer. A substrate with a surface-collection-layer was thus obtained. The resulting substrate with a surface-collection-layer had a diameter of 118 mm, a length of 124 mm, and a plugging depth of 3 mm. The substrate with a surface-collection-layer was evaluated as described above.

The substrate with a surface-collection-layer of this example had a rib thickness (partition wall thickness) of 127 μm and a cell density of 15.5 cells/cm². The partition wall had a porosity of 52% and an average pore size of 17 μm. The surface-collection-layer had a porosity of 85%, an average pore size of 4 μm, an outlet-side thickness of 50 and a center thickness of 20 μm. The PM collection efficiency evaluation result was "Good", the pressure loss evaluation result was "Good", the strength evaluation result was "Good", and the overall evaluation result was "Good".

Examples 2 to 22 and Comparative Examples 1 to 10

A substrate with a surface-collection-layer was produced in the same manner as in Example 1, except for employing the conditions shown in Table 1. The resulting substrate with a surface-collection-layer was evaluated as described above. The evaluation results are shown in Table 1.

TABLE 1

| | Rib | | Partition wall | | Surface-collection layer | | | | | | | |
|---|---|---|---|---|---|---|---|---|---|---|---|---|
| | thickness (μm) | Cell density (cells/cm²) | Porosity (%) | Average pore size (μm) | Porosity (%) | Average pore size (μm) | Outlet-side thickness (μm) | Center thickness (μm) | PM collection efficiency | Pressure loss | Strength | Overall evaluation |
| Example 1 | 127.0 | 15.5 | 52 | 17 | 85 | 4 | 50 | 20 | Good | Good | Good | Good |
| Example 2 | 177.8 | 15.5 | 60 | 17 | 85 | 4 | 50 | 20 | Good | Good | Good | Good |
| Example 3 | 304.8 | 15.5 | 65 | 22 | 85 | 4 | 50 | 20 | Good | Good | Good | Good |
| Example 4 | 127.0 | 31.0 | 52 | 17 | 85 | 4 | 50 | 20 | Good | Good | Good | Good |
| Example 5 | 177.8 | 31.0 | 60 | 17 | 85 | 4 | 50 | 20 | Good | Good | Good | Good |
| Example 6 | 304.8 | 31.0 | 65 | 22 | 85 | 4 | 50 | 20 | Good | Good | Good | Good |
| Example 7 | 76.2 | 46.5 | 52 | 17 | 85 | 4 | 50 | 20 | Good | Good | Good | Good |
| Example 8 | 203.2 | 46.5 | 60 | 17 | 85 | 4 | 50 | 20 | Good | Good | Good | Good |
| Example 9 | 304.8 | 46.5 | 65 | 22 | 85 | 4 | 50 | 20 | Good | Good | Good | Good |
| Example 10 | 304.8 | 46.5 | 65 | 27 | 85 | 4 | 50 | 20 | Good | Good | Good | Good |
| Example 11 | 304.8 | 46.5 | 65 | 40 | 85 | 4 | 50 | 20 | Good | Good | Good | Good |
| Example 12 | 50.8 | 62.0 | 52 | 17 | 85 | 4 | 50 | 20 | Good | Good | Good | Good |
| Example 13 | 101.6 | 62.0 | 60 | 17 | 85 | 4 | 50 | 20 | Good | Good | Good | Good |
| Example 14 | 152.4 | 62.0 | 65 | 22 | 85 | 4 | 50 | 20 | Good | Good | Good | Good |
| Example 15 | 304.8 | 46.5 | 65 | 22 | 85 | 3 | 50 | 20 | Good | Good | Good | Good |
| Example 16 | 304.8 | 46.5 | 65 | 22 | 80 | 3 | 50 | 20 | Good | Good | Good | Good |
| Example 17 | 304.8 | 46.5 | 65 | 22 | 75 | 3 | 50 | 20 | Good | Good | Good | Good |
| Example 18 | 304.8 | 46.5 | 65 | 22 | 87 | 6 | 50 | 20 | Good | Good | Good | Good |
| Example 19 | 304.8 | 46.5 | 65 | 22 | 80 | 6 | 50 | 20 | Good | Good | Good | Good |
| Example 20 | 304.8 | 46.5 | 65 | 22 | 75 | 6 | 50 | 20 | Good | Good | Good | Good |
| Example 21 | 304.8 | 46.5 | 65 | 22 | 85 | 8 | 50 | 20 | Good | Good | Good | Good |
| Example 22 | 304.8 | 46.5 | 65 | 22 | 85 | 8 | 50 | 20 | Good | Good | Good | Good |
| Comparative Example 1 | 304.8 | 46.5 | 65 | 14 | 85 | 4 | 50 | 20 | Good | Bad | Good | Bad |
| Comparative Example 2 | 304.8 | 46.5 | 65 | 47 | 85 | 4 | 50 | 20 | Bad | Good | Bad | Bad |
| Comparative Example 3 | 304.8 | 46.5 | 35 | 22 | 85 | 4 | 50 | 20 | Good | Bad | Good | Bad |
| Comparative Example 4 | 304.8 | 46.5 | 75 | 22 | 85 | 4 | 50 | 20 | Good | Good | Bad | Bad |
| Comparative Example 5 | 304.8 | 46.5 | 65 | 22 | 40 | 4 | 50 | 20 | Good | Bad | Good | Bad |
| Comparative Example 6 | 304.8 | 46.5 | 65 | 22 | 95 | 4 | 50 | 20 | Good | Good | Bad | Bad |
| Comparative Example 7 | 50.8 | 62.0 | 52 | 17 | 87 | 0.09 | 50 | 20 | Good | Bad | Good | Bad |
| Comparative Example 8 | 304.8 | 46.5 | 65 | 22 | 87 | 13 | 50 | 20 | Bad | Good | Good | Bad |
| Comparative Example 9 | 304.8 | 46.5 | 65 | 14 | — | — | — | — | Bad | Good | Good | Bad |
| Comparative Example 10 | 304.8 | 46.5 | 65 | 22 | 87 | 3 | 50 | 50 | Good | Bad | Good | Bad |

Example 23

First, a substrate with a surface-collection-layer was produced in the same manner as in Example 1, except for employing the conditions shown in Table 2. The resulting catalyst-carrying substrate with a surface-collection-layer was coated with a catalyst to obtain a catalyst-carrying substrate with a surface-collection-layer.

Specifically, a catalyst slurry containing platinum (Pt) (noble metal), activated alumina, and ceria (oxygen adsorption agent) was prepared. The mass ratio of platinum, activated alumina, and ceria was platinum:activated alumina:ceria=1:80:20. Then, a coating layer was formed on the inner surface and inside the pores of the partition wall of the substrate with a surface-collection-layer by a suction method using the above obtained catalyst slurry. The coating layer was formed by immersing the outlet-side end of the substrate with a surface-collection-layer in the catalyst slurry, and sucking the catalyst slurry through the inlet-side end (i.e., the catalyst slurry was introduced into the cells in which the surface-collection-layer was formed from the cells in which the surface-collection-layer was not formed). After forming the coating layer, the resulting product was dried at 600° C. to obtain a catalyst-carrying substrate with a surface-collection-layer. The amount of noble metal (Pt) supported on the catalyst-carrying substrate with a surface-collection-layer was 2 g per liter (volume) of the substrate. The amount of catalyst slurry (dry mass) applied to the catalyst-carrying substrate with a surface-collection-layer was 150 g per liter (volume) of the substrate ("Catalyst coating amount (g/1)" in Table 2).

The gas purification rate evaluation result (HC, CO, and NOx) for the catalyst-carrying substrate with a surface-collection-layer of the present example was "Good". The PM collection efficiency evaluation result, the pressure loss evaluation result, the strength evaluation result, and the overall evaluation result were also "Good".

Examples 24 to 44 and Comparative Examples 11 to 20

A catalyst-carrying substrate with a surface-collection-layer was produced in the same manner as in Example 23, except for producing a substrate with a surface-collection-layer under the conditions shown in Table 2, and changing the catalyst coating amount (g/l) as shown in Table 2. The resulting catalyst-carrying substrate with a surface-collection-layer was evaluated as described above. The evaluation results are shown in Table 2.

TABLE 2

| | Substrate with surface-collection-layer | | | | | | | | Catalyst |
|---|---|---|---|---|---|---|---|---|---|
| | | | Partition wall | | Surface-collection layer | | | | |
| | Rib thickness (μm) | Cell density (cells/cm²) | Porosity (%) | Average pore size (μm) | Porosity (%) | Average pore size (μm) | Outlet-side thickness (μm) | Center thickness (μm) | Coating amount (g/L) |
| Example 23 | 127 | 15.5 | 52 | 15 | 82 | 3 | 50 | 20 | 150 |
| Example 24 | 177.8 | 15.5 | 60 | 15 | 82 | 3 | 50 | 20 | 150 |
| Example 25 | 304.8 | 15.5 | 65 | 20 | 82 | 3 | 50 | 20 | 150 |
| Example 26 | 127 | 31.0 | 52 | 15 | 82 | 3 | 50 | 20 | 150 |
| Example 27 | 177.8 | 31.0 | 60 | 15 | 82 | 3 | 50 | 20 | 150 |
| Example 28 | 304.8 | 31.0 | 65 | 20 | 82 | 3 | 50 | 20 | 150 |
| Example 29 | 76.2 | 46.5 | 52 | 15 | 82 | 3 | 50 | 20 | 150 |
| Example 30 | 203.2 | 46.5 | 60 | 15 | 82 | 3 | 50 | 20 | 150 |
| Example 31 | 304.8 | 46.5 | 65 | 20 | 82 | 3 | 50 | 20 | 150 |
| Example 32 | 304.8 | 46.5 | 65 | 25 | 82 | 3 | 50 | 20 | 150 |
| Example 33 | 304.8 | 46.5 | 65 | 38 | 82 | 3 | 50 | 20 | 150 |
| Example 34 | 50.8 | 62.0 | 52 | 15 | 82 | 3 | 50 | 20 | 150 |
| Example 35 | 101.6 | 62.0 | 60 | 15 | 82 | 3 | 50 | 20 | 150 |
| Example 36 | 152.4 | 62.0 | 65 | 20 | 82 | 3 | 50 | 20 | 150 |
| Example 37 | 304.8 | 46.5 | 65 | 20 | 82 | 2 | 50 | 20 | 150 |
| Example 38 | 304.8 | 46.5 | 65 | 20 | 75 | 2 | 50 | 20 | 150 |
| Example 39 | 304.8 | 46.5 | 65 | 20 | 70 | 2 | 50 | 20 | 150 |
| Example 40 | 304.8 | 46.5 | 65 | 20 | 82 | 5 | 50 | 20 | 150 |
| Example 41 | 304.8 | 46.5 | 65 | 20 | 75 | 5 | 50 | 20 | 150 |
| Example 42 | 304.8 | 46.5 | 65 | 20 | 70 | 5 | 50 | 20 | 150 |
| Example 43 | 304.8 | 46.5 | 65 | 20 | 80 | 7 | 50 | 20 | 150 |
| Example 44 | 304.8 | 46.5 | 65 | 20 | 80 | 7 | 50 | 20 | 150 |
| Comparative Example 11 | 304.8 | 46.5 | 65 | 12 | 80 | 3 | 50 | 20 | 150 |
| Comparative Example 12 | 304.8 | 46.5 | 65 | 45 | 80 | 3 | 50 | 20 | 150 |
| Comparative Example 13 | 304.8 | 46.5 | 35 | 20 | 80 | 3 | 50 | 20 | 150 |
| Comparative Example 14 | 304.8 | 46.5 | 75 | 20 | 80 | 3 | 50 | 20 | 150 |
| Comparative Example 15 | 304.8 | 46.5 | 65 | 20 | 45 | 3 | 50 | 20 | 150 |
| Comparative Example 16 | 304.8 | 46.5 | 65 | 20 | 92 | 3 | 50 | 20 | 150 |
| Comparative Example 17 | 50.8 | 62.0 | 52 | 15 | 82 | 0.08 | 50 | 20 | 150 |
| Comparative Example 18 | 304.8 | 46.5 | 65 | 20 | 82 | 12 | 50 | 20 | 150 |
| Comparative Example 19 | 304.8 | 46.5 | 65 | 12 | — | — | — | — | 150 |

TABLE 2-continued

| | | | | | | | | | |
|---|---|---|---|---|---|---|---|---|---|
| Comparative Example 20 | 304.8 | 46.5 | 65 | 20 | 82 | 3 | 50 | 50 | 150 |

| | Gas purification rate | | | PM collection efficiency | Pressure loss | Strength | Overall evaluation |
|---|---|---|---|---|---|---|---|
| | HC | CO | NOx | | | | |
| Example 23 | Good | Good | Good | Good | Good | Good | Good |
| Example 24 | Good | Good | Good | Good | Good | Good | Good |
| Example 25 | Good | Good | Good | Good | Good | Good | Good |
| Example 26 | Good | Good | Good | Good | Good | Good | Good |
| Example 27 | Good | Good | Good | Good | Good | Good | Good |
| Example 28 | Good | Good | Good | Good | Good | Good | Good |
| Example 29 | Good | Good | Good | Good | Good | Good | Good |
| Example 30 | Good | Good | Good | Good | Good | Good | Good |
| Example 31 | Good | Good | Good | Good | Good | Good | Good |
| Example 32 | Good | Good | Good | Good | Good | Good | Good |
| Example 33 | Good | Good | Good | Good | Good | Good | Good |
| Example 34 | Good | Good | Good | Good | Good | Good | Good |
| Example 35 | Good | Good | Good | Good | Good | Good | Good |
| Example 36 | Good | Good | Good | Good | Good | Good | Good |
| Example 37 | Good | Good | Good | Good | Good | Good | Good |
| Example 38 | Good | Good | Good | Good | Good | Good | Good |
| Example 39 | Good | Good | Good | Good | Good | Good | Good |
| Example 40 | Good | Good | Good | Good | Good | Good | Good |
| Example 41 | Good | Good | Good | Good | Good | Good | Good |
| Example 42 | Good | Good | Good | Good | Good | Good | Good |
| Example 43 | Good | Good | Good | Good | Good | Good | Good |
| Example 44 | Good | Good | Good | Good | Good | Good | Good |
| Comparative Example 11 | Good | Good | Good | Good | Bad | Good | Bad |
| Comparative Example 12 | Good | Good | Bad | Bad | Good | Bad | Bad |
| Comparative Example 13 | Good | Good | Good | Good | Bad | Good | Bad |
| Comparative Example 14 | Good | Good | Good | Good | Good | Bad | Bad |
| Comparative Example 15 | Good | Good | Good | Good | Bad | Good | Bad |
| Comparative Example 16 | Good | Good | Good | Good | Good | Bad | Bad |
| Comparative Example 17 | Bad | Bad | Bad | Good | Bad | Good | Bad |
| Comparative Example 18 | Good | Good | Good | Bad | Good | Good | Bad |
| Comparative Example 19 | Bad | Bad | Bad | Bad | Good | Good | Bad |
| Comparative Example 20 | Bad | Bad | Bad | Good | Bad | Good | Bad |

As shown in Tables 1 and 2, it was confirmed that the substrates with a surface-collection-layer of Examples 1 to 22 had a sufficient partition wall strength, a low pressure loss, and a high particulate matter collection efficiency as compared with the substrates with a surface-collection-layer of Comparative Examples 1 to 10, and May be used for a gasoline direct injection engine. It was also confirmed that the catalyst-carrying substrates with a surface-collection-layer of Examples 23 to 44 had a sufficient partition wall strength, a low pressure loss, and a high particulate matter collection efficiency as compared with the catalyst-carrying substrates with a surface-collection-layer of Comparative Examples 1-1 to 20, and may be used for a gasoline direct injection engine.

INDUSTRIAL APPLICABILITY

The substrate with a surface-collection-layer and the catalyst-carrying substrate with a surface-collection-layer according to the present invention may suitably be used as a filter that purifies particulate matter and toxic gas components contained in exhaust gas discharged from a gasoline direct injection engine among internal combustion engines (e.g., automotive engine and industrial engine), combustion apparatuses, and the like.

EXPLANATION OF SYMBOLS

1: substrate with surface-collection-layer, 3, 3a, 3b, and 103: cell, 2a: inlet-side open end face, 2b: outlet-side open end face, 4 and 104: partition wall, 10 and 110: plugging portion, 11: honeycomb substrate, 15: surface-collection-layer, 17: solid area, 19: void area, 21: inscribed circle, K: cubic curve calculated by least squares approximation, L: depth of surface-collection-layer, P: field of view, T: thickness of partition wall.

The invention claimed is:
1. A substrate with a surface-collection-layer that is used for a gasoline direct injection engine, the substrate comprising a honeycomb substrate that includes a porous partition wall that defines and forms a plurality of cells serving as exhaust gas passages, and has a number of pores, and a plurality of plugging sections that plug an inlet-side open end of given cells among the plurality of cells, and plug an outlet- side open end of the remaining cells, a surface-collection-layer that has an average pore size smaller than that of the partition wall being formed on a surface of the partition wall that defines the remaining cells, wherein, when viewed in a cross section parallel to a center axis of the substrate, a thickness of the surface-collection-layer on the inlet-side end is smaller than the thickness of the surface-collection-layer in a center of the substrate, the thickness of the surface-collection-layer on the outlet-side end is larger than the thickness of the surface-collection-layer in the center of the substrate by a factor of 2.5 to 3, and the thickness of the surface-collection-layer increases from the inlet-side to the outlet-side, the partition wall having a thickness of 50.8 to 304.8 μm, a porosity of 50% or more and less than 70%, and an average pore size of 15 to 40 μm, the surface-collection-layer having a thickness of 10 μm or more and less than 100 μm, a porosity of 50% or more and less than 90%, and an average pore size of 0.1 μm or more and less than 10 μm, and the substrate having a cell density of 15.5 to 62.0 cells/cm$^2$, wherein the surface-collection-layer is adapted to trap particulate matter from the gasoline direct injection engine and the substrate is regenerated by burning the particulate matter collected on the surface of the surface-collection-layer.

2. The substrate with a surface-collection-layer according to claim 1, wherein the surface-collection-layer is formed by supplying a raw material gas including raw material particles through the inlet-side open end of the honeycomb substrate so that the raw material particles are deposited on the surface of the partition wall that forms the remaining cells.

3. The substrate with a surface-collection-layer according to claim 1, wherein the substrate is formed of a material that contains at least one ceramic selected from the group consisting of cordierite, aluminum titanate, silicon carbide, sialon, mullite, silicon nitride, zirconium phosphate, zirconia, titania, alumina, and silica.

4. A catalyst-carrying substrate with a surface-collection-layer comprising the substrate according to claim 1, and a catalyst that is supported on at least an inner surface of the pores in the partition wall of the substrate.

5. The catalyst-carrying substrate with a surface-collection-layer according to claim 4, wherein the catalyst is a three-way catalyst or a NOx adsorption/reduction catalyst.

6. The substrate with a surface-collection-layer according to claim 1, wherein the partition wall has a thickness of 76.2 to 127 μm.

* * * * *